Figure 1:
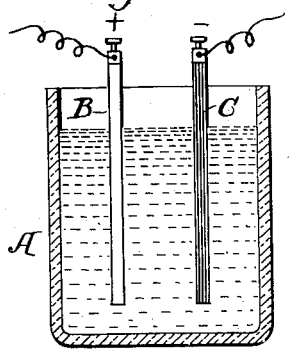

No. 672,913. Patented Apr. 30, 1901.
C. POLLAK.
ELECTROLYTIC CURRENT RECTIFIER AND CONDENSER.
(No Model.)

Witnesses

Inventor
Charles Pollak
By Foster Freeman Attorneys

UNITED STATES PATENT OFFICE.

CHARLES POLLAK, OF FRANKFORT-ON-THE-MAIN, GERMANY.

ELECTROLYTIC CURRENT RECTIFIER AND CONDENSER.

SPECIFICATION forming part of Letters Patent No. 672,913, dated April 30, 1901.

Application filed March 7, 1899. Serial No. 708,147. (No model.)

*To all whom it may concern:*

Be it known that I, CHARLES POLLAK, a subject of the Emperor of Austria-Hungary, and a resident of Frankfort-on-the-Main, Germany, have invented certain new and useful Improvements in Electrolytic Current Rectifiers and Condensers, of which the following is a specification.

Electrolytic cells of a certain kind may be used as transformers of alternating into direct currents or as static condensers, and therefore can properly be called "electrolytic transformers and condensers." The principles of such cells are known already, and one improved method of arranging and preparing their electrodes in suitable electrolytes forms the subject-matter of my previous application. If used for the purpose of rectifying alternating currents—*i. e.*, of changing them in direct currents—the cells are provided with two different electrodes. One electrode must consist of a metal or body that receives an insulating layer immediately by electrolytic action if connected with the positive-current conductor. As soon as the current in the conductor is reversed and the electrode becomes negative (cathode) the insulating layer disappears and now the current may pass without any considerable resistance through the electrolyte. The other electrode consists of a more or less indifferent body that does not oppose the current in any direction. Thus taking, for instance, aluminium, magnesium, or other substances as the insulating and lead or copper, &c., as the indifferent electrode we have a cell which can be passed by currents in the direction from lead to aluminium, but not so in the opposite sense, from the aluminium to the lead electrode, the aluminium now being the anode or positive part and immediately protected by an insulating-coating capable of withstanding the action of high voltages. One part only of an alternating-current wave can pass such a cell; but by suitable arrangement of two or four cells all parts of an alternating current may be rectified. In the second case when the cell is to be used as a static condenser connected in parallel or in series with an alternating system both electrodes must belong to the insulating class, as the current should not pass in any direction and the specific static capacity of the electrodes is only needed. This static capacity of such electrodes is very high and can easily be increased by using porous surfaces of the plates. The action of the electrodes during the passage of alternating waves is similar to the former case, as the electrode connected to the momentarily-positive conductor always stops the current, while the other does the same for the opposite current impulse, the leakage being very small in good cells.

Figure 2:
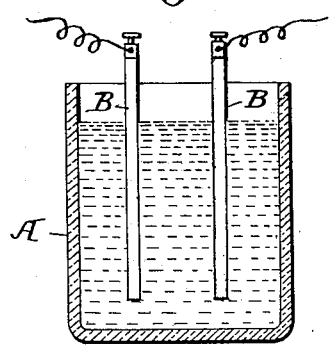
Figure 3:
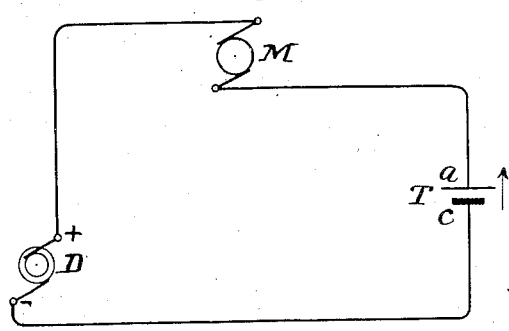
Figure 4:
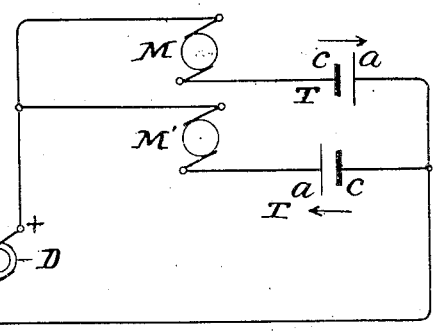
Figure 5:
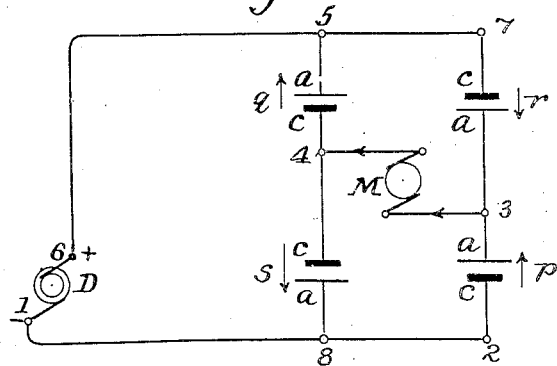

In the drawings, Figure 1 shows an electrolytic transforming-cell, while Fig. 2 shows a condensing-cell. Fig. 3 is a diagram of connections whereby one part of an alternating-current is rectified. Fig. 4 is a diagram of connections whereby both positive and negative parts of an alternating current are rectified by the use of two cells and a continuous current results. Fig. 5 is a diagram of connections for rectifying both the positive and negative parts of an alternating current by the use of four cells.

In Fig. 1, A represents a suitable jar or cup containing an aluminium electrode B and an electrode C, of lead or copper, &c., both immersed in a suitable electrolyte. If the electrode B is connected with the positive pole of a generator, current cannot pass from B to C; but should the current be reversed it may pass from C to B.

In Fig. 2, two aluminium electrodes B are shown in the jar or cup A, containing a suitable electrolyte. In this case current can pass in neither direction and the cell forms an electrolytic condenser.

In Fig. 3, G represents an alternating-current dynamo, and M a direct-current motor, while T represents an electrolytic cell, with an aluminium electrode $a$ and a lead or copper electrode $c$. Therefore only those parts of the alternating current in the direction from $c$ to $a$ can pass through the cell and the motor M receives a continuous current.

In Fig. 4, D is an alternator, as before, while M M' are direct-current motors connected in parallel, but each in series with an electrolytic cell T. The cells are so arranged with aluminium electrodes $a$ and carbon electrodes $c$ that they rectify opposite parts of the alternating current, so that the motors each receive a continuous current, but in opposite directions.

In Fig. 5, D is an alternator, in the circuit of which are two electrolytic transforming-cells $q$ and $s$, connected between the points 5 and 8, and two cells $r$ and $p$, connected between 7 and 2, with the direct-current motor M connected between the points 3 and 4. A continuous current will always pass through M in the direction from 3 to 4, since one part of the alternating current will take the path from the pole 1 of the alternator to the point 2, through cell $p$ to the point 3, through M to 4, through $q$ to 5, and back to pole 6 of the alternator. The other part of the alternating current will pass from pole 6 through cells $r$ and $s$ and motor M and back to the alternator.

Having explained the general principles of electrolytic transformers and condensers of this class, I turn now to the description of the present improvement.

In the course of these studies and experiments made with these transformers I have noticed that the perfect action of the cells depends largely on the electrolyte used. The strain put on transformer-cells used for technical purposes is very great, especially with regard to the high frequencies employed in alternating-current plants. If the losses due to leakage are not to be excessive, the action of the electrolyte on the "insulating-electrodes" must be very rapid and perfect, and this concerns not only the formation of the insulating layer, but its destruction, too, when the current is to pass free. The following combinations have given entire satisfaction in that regard. As active electrodes in transformers or condensers I use any substance that can receive an insulating-coating by electrolytic action when connected to the then positive conductor—i. e., the electrode being an anode at the given moment, preferably aluminium or other metals.

As electrolytes I make use of, first, organic acids of the $CnH_2nO$ (sebacic acids, oxalic series) class, which contain ($a$) two or more groups of carboxyle (for instance, oxalic acid) ($b$) combined with one or more groups of carboxyle, one or more oxy groups, (for instance, malic and tartaric acid,) kelo groups, (for instance, acetic acid,) or aldehyde groups, (for instance, glyoxalic acid;) second, organic acids of the aromatic class, containing the groups mentioned sub 1, $a$ and $b$, (for instance, phtalic, salicylic, gallic acid, and others;) third, alkaline salts of the organic acids mentioned sub 1, $a$ and $b$, and 2.

It is easily observed by experiment that the presence of acids or acid ions in the electrolyte favorably influences the rapid formation of the insulating layer, while the alkalies, or rather alkaline ions, contribute to the rapid removal of the insulating-coating as soon as the current begins to flow in opposite direction and renders the electrode negative. Consequently the electrolytes cited sub 1 and 2 are best suited for condensers where a rapid formation is needed, while the compounds mentioned in 3, which contain alkaline and acid ions combined, are specially adapted for current-tranformers when rapid formation and rapid removal of the insulating layer are of equal importance.

It is very advisable to prepare the electrodes before using them, and this may be effected with continuous or alternating currents at high voltage (five hundred or more volts) by interposing gradually-diminished resistance in the circuit until the electrode can withstand the full pressure without any harm, thus being ready for use.

It may be still mentioned that the cells described give the best results when kept at a uniform and low temperature.

I claim—

1. An electrolytic transforming or condensing cell having an electrolyte containing a free organic acid, substantially as specified.

2. An electrolytic transforming or condensing cell having an electrolyte containing a free organic acid of the aromatic class, substantially as specified.

In testimony whereof I have signed my name to this specification in the presence of two subscribing witnesses.

CHARLES POLLAK.

Witnesses:
  WM. HARRISON BRADLEY,
  FREDERICK MARTHEL.